US008063336B2

(12) United States Patent
Gefter et al.

(10) Patent No.: US 8,063,336 B2
(45) Date of Patent: Nov. 22, 2011

(54) MULTI-FREQUENCY STATIC NEUTRALIZATION

(75) Inventors: Peter Gefter, South San Francisco, CA (US); Scott Gehlke, Berkeley, CA (US)

(73) Assignee: Ion Systems, Inc., Alameda, CA (US)

( * ) Notice: Subject to any disclaimer, the term of this patent is extended or adjusted under 35 U.S.C. 154(b) by 1376 days.

(21) Appl. No.: 11/398,446

(22) Filed: Apr. 5, 2006

(65) Prior Publication Data

US 2007/0138149 A1 Jun. 21, 2007

Related U.S. Application Data

(63) Continuation-in-part of application No. 11/136,754, filed on May 25, 2005, now Pat. No. 7,479,615, which is a continuation-in-part of application No. 10/821,773, filed on Apr. 8, 2004, now Pat. No. 7,057,130.

(51) Int. Cl.
*B23K 10/00* (2006.01)

(52) U.S. Cl. ......... 219/121.52; 219/121.36; 219/121.57; 156/345.47; 361/232; 250/288

(58) Field of Classification Search ............. 219/121.36, 219/121.48, 121.4, 121.41, 121.43, 121.44; 361/232, 250; 250/423 F, 288
See application file for complete search history.

(56) References Cited

U.S. PATENT DOCUMENTS 4,417,293 A 11/1983 Larigaldie
5,095,400 A 3/1992 Saito
5,388,769 A 2/1995 Rodrigo et al.
5,550,703 A 8/1996 Beyer et al.
5,630,949 A 5/1997 Lakin
5,847,917 A 12/1998 Suzuki
6,145,391 A 11/2000 Pui et al.
6,330,146 B1 12/2001 Blitshteyn et al.
6,504,700 B1 1/2003 Hahne et al.
6,636,411 B1 10/2003 Noll
(Continued)

FOREIGN PATENT DOCUMENTS

JP 5047490 2/1993
(Continued)

OTHER PUBLICATIONS

Lee W. Young, PCT Written Opinion for PCT/US07/65767, Jul. 23, 2008, pp. 1-7, USPTO ISA/US, Virginia, US.

(Continued)

*Primary Examiner* — Mark Paschall
(74) *Attorney, Agent, or Firm* — Stephen R. Uriarte

(57) ABSTRACT

Static neutralization of a charged object is provided by applying an alternating voltage having a complex waveform, hereinafter referred to as a "multi-frequency voltage", to an ionizing electrode in an ionizing cell. When the multi-frequency voltage, measured between the ionizing electrode and a reference electrode available from the ionizing cell, equals or exceeds the corona onset voltage threshold of the ionizing cell, the multi-frequency voltage generates a mix of positively and negatively charged ions, sometimes collectively referred to as a "bipolar ion cloud". The bipolar ion cloud oscillates between the ionizing electrode and the reference electrode. The multi-frequency voltage also redistributes these ions into separate regions according to their negative or positive ion potential when the multi-frequency voltage creates a polarizing electrical field of sufficient strength. The redistribution of these ions increases the effective range in which available ions may be displaced or directed towards a charged object.

39 Claims, 8 Drawing Sheets

U.S. PATENT DOCUMENTS

| | | | | |
|---|---|---|---|---|
| 6,653,638 | B2 | 11/2003 | Fujii | |
| 6,671,161 | B2 | 12/2003 | Nilsson | |
| 6,693,788 | B1 | 2/2004 | Partridge | |
| 6,807,044 | B1 | 10/2004 | Vernitsky et al. | |
| 6,826,030 | B2 | 11/2004 | Gorczyca et al. | |
| 7,479,615 | B2 | 1/2009 | Gefter et al. | |
| 7,679,026 | B1 * | 3/2010 | Gefter et al. | 219/121.52 |
| 2002/0125423 | A1 | 9/2002 | Ebeling et al. | |
| 2003/0007307 | A1 | 1/2003 | Lee et al. | |
| 2003/0011957 | A1 | 1/2003 | Nilsson | |
| 2004/0130271 | A1 | 7/2004 | Sekoguchi et al. | |
| 2005/0052815 | A1 | 3/2005 | Fujiwara et al. | |
| 2005/0225922 | A1 * | 10/2005 | Gefter et al. | 361/212 |

FOREIGN PATENT DOCUMENTS

| | | | |
|---|---|---|---|
| JP | 05047490 | A | 2/1993 |
| JP | 7249497 | | 9/1995 |
| JP | 07249497 | A | 9/1995 |
| JP | 10055896 | | 2/1998 |
| JP | 10055896 | A | 2/1998 |
| JP | 2000058290 | | 8/1998 |
| JP | 11273893 | | 9/1999 |
| JP | 11273893 | A | 10/1999 |
| JP | 10268895 | | 2/2000 |
| JP | 2000058290 | A | 2/2000 |
| JP | 2002216994 | A | 8/2002 |
| JP | 2002216994 | | 9/2002 |
| WO | WO0038484 | | 6/2000 |

OTHER PUBLICATIONS

Lee W. Young, PCT International Search Report for PCT/US/065767, Jul. 23, 2008, pp. 1-3, USPTO ISA/US, Virginia, US.

Written Opinion of the International Searching Authority, PCT/US0509093, Jul. 28, 2005.

* cited by examiner

MULTI-FREQUENCY STATIC NEUTRALIZATION

CROSS-REFERENCE TO RELATED APPLICATIONS

This application is a continuing-in-part application, which claims the benefit of U.S. patent application, entitled "Wide Range Static Neutralizer and Method, having Ser. No. 11/136,754, and filed on May 25, 2005, which in turn claims the benefit of U.S. patent application, entitled "Ion Generation Method and Apparatus, having Ser. No. 10/821,773, and filed on Apr. 8, 2004.

BACKGROUND OF THE INVENTION

Field of the Invention

The present invention relates to static neutralization, and more particularly, to static neutralization of a charged objects located at distance within a relatively wide range from an ion generating source using a multi-frequency voltage.

DETAILED DESCRIPTION OF THE INVENTION

While the invention has been described in conjunction with a specific best mode, it is to be understood that many alternatives, modifications and variations will be apparent to those skilled in the art in light of the following description. The use of these alternatives, modifications and variations in or with the various embodiments of the invention shown below would not require undue experimentation or further invention.

The various embodiments of the present invention, described below, are generally directed to the electrostatic neutralization of an electro-statically-charged object, named "charged object", by applying an alternating voltage having a complex waveform, hereinafter referred to as a "multi-frequency voltage", to an ionizing electrode in an ionizing cell. When the multi-frequency voltage, measured between the ionizing electrode and a reference electrode available from the ionizing cell, exceeds the corona onset voltage threshold of the ionizing cell, the multi-frequency voltage generates a mix of positively and negatively charged ions, sometimes collectively referred to as a "bipolar ion cloud". The multi-frequency voltage also redistributes these ions into separate regions according to their negative or positive ion potential when the multi-frequency voltage creates a polarizing electrical field of sufficient strength. The redistribution, sometimes referred to as polarization herein, of these ions increases the effective range in which available ions may be displaced or directed towards a charged object.

The bipolar ion cloud has a weighted center that oscillates between the ionizing electrode and the reference electrode. The term "weighted center" when used in reference to a bipolar ion cloud refers to a space of the ion cloud having the highest concentration of approximately equal number of positive and negative ions.

The term "ionizing electrode" includes any electrode that has a shape suitable for generating ions.

The term "corona onset voltage threshold" is a voltage amount, measured between an ionizing electrode and a reference electrode, that when reached or exceeded creates ions by corona discharge. The corona onset voltage threshold is typically a function of the parameters of the ionization cell, such as configuration and dimensions, the polarity of the ionizing voltage, and the physical environment in which the ionization cell is used. For a filament or wire type ionizing electrode, the corona onset voltage threshold is typically in the range of 4 kV and 6 kV for positive ionizing voltages and in the range of −3.5 kV and −5.5 kV for negative ionizing voltages.

Figure 1A:
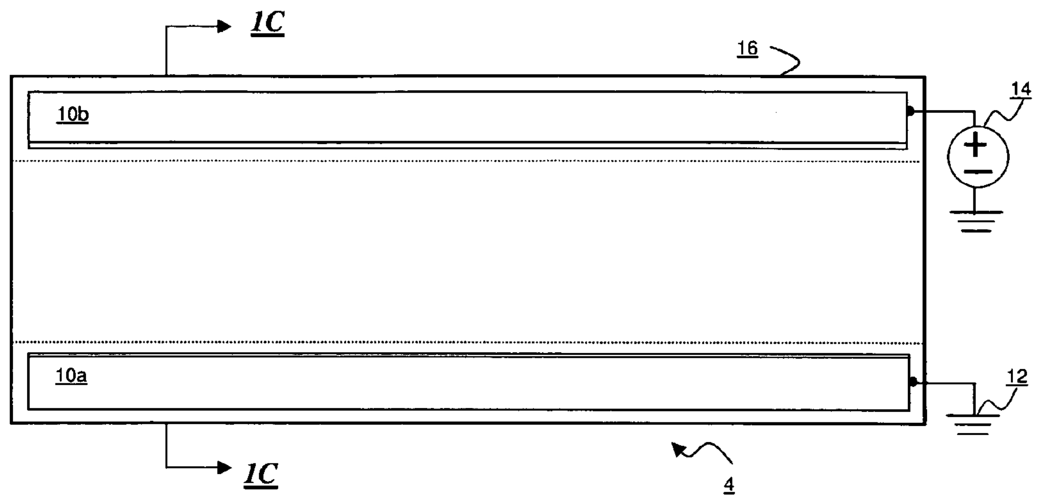
FIGS. 1A-1B are top and bottom views, respectively, in block illustration form of an ionizing cell in accordance with a first embodiment of the present invention.
Figure 1B:
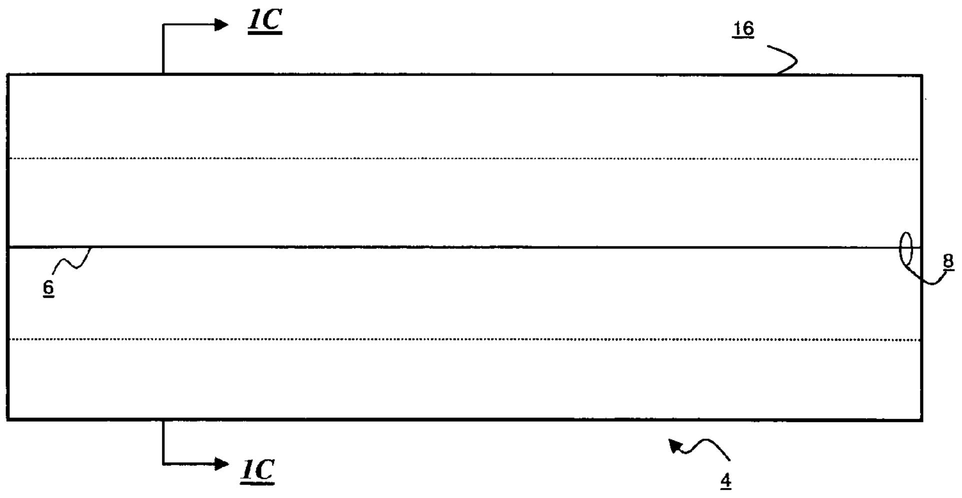
Figure 1C:
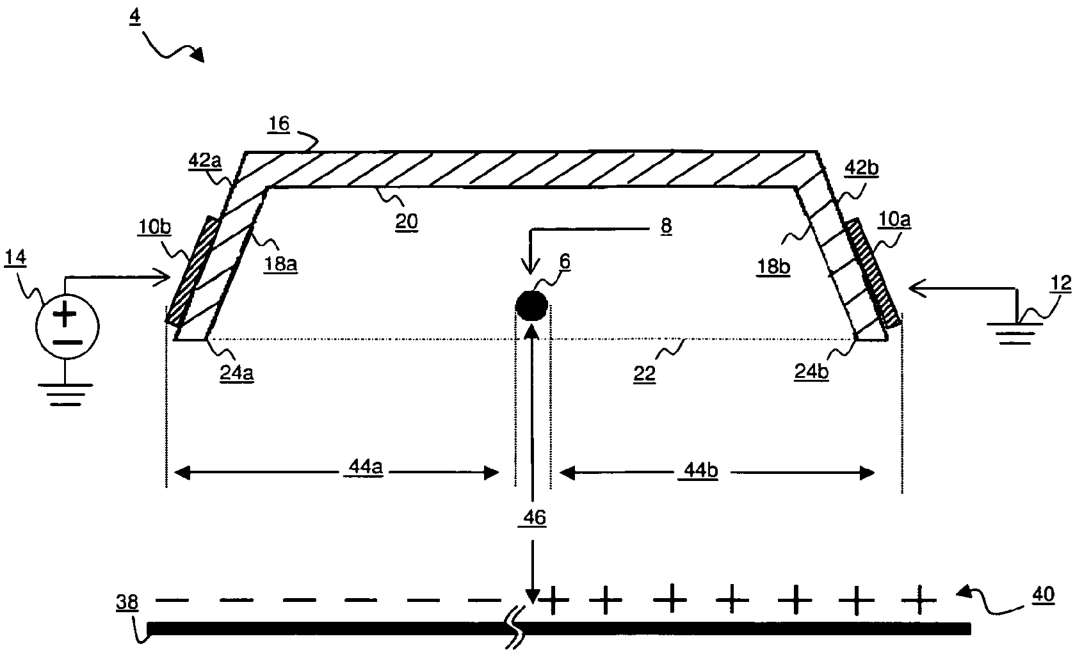
FIG. 1C is a sectional view along line 1C-1C of the ionizing cell illustrated in FIGS. 1A-1B.

Referring now to FIGS. 1A through 1C, an ionizing cell 4 is illustrated in accordance with a first embodiment of the present invention. Ionizing cell 4 includes an ionizing electrode 6 for receiving a multi-frequency voltage 8 and electrodes **10*a* and 10*b* for receiving respectively a reference voltage 12, such as ground, and an ion balancing voltage 14. Electrodes 10*a* and 10*b* are hereafter named reference electrodes 10*a* and 10*b*, respectively. Ionizing cell 4 also includes a structure 16 that provides a mechanical and electrically insulating support for electrode 6 and reference electrodes 10*a* and 10*b***.

Using two reference electrodes is not intended to limit the present invention in any way. One of ordinary skill in the art would readily recognize that an ionizing cell may be limited to a single reference electrode for receiving a reference voltage 12 that may be fixed or dynamically adjusted according to the balance of positive ions and negative ions desired. For example, reference voltage 12 may be set to ground. In another example, reference voltage 12 may be adjusted dynamically using a current sensing circuit (not shown) that senses the ion current balance created during corona discharge and that adjusts ion balancing voltage 14 to maintain an approximate balance of positive and negative ions created. In both examples, using a separate ion balancing voltage and an additional reference electrode to receive the ion balancing voltage may be omitted, such as ion balancing voltage 14 and reference electrode **10*b***, respectively.

In another example, the reference electrode(s) used may be coupled to the common output, such as ground, of a power supply, which is not shown in FIGS. 1A through 1C, having a voltage output providing a multi-frequency voltage. One example of such as a power supply is disclosed in FIG. 5 or 6, below.

Ionizing electrode 6 is located within structure 16, such as at a location within the space defined between inner side walls **18*a* and 18*b* and between inner top surface 20 and a plane 22** defined by edges 24*a* and 24*b* of inner side walls 18*a* and 18*b*, respectively. The location of ionizing electrode 6 within structure 16 is not intended to limit the various embodiments disclosed herein although one of ordinary skill in the art would readily recognize after receiving the benefit of the herein disclosure that locating ionizing electrode 6 within structure 16 enhances the harvesting of ions when using a driven gas, such as air, to assist with the dispersion of these ions.

Ionizing electrode 6 has a shape suitable for generating ions by corona discharge and, in the example shown in FIGS. 1A through 1C, is in the form of a filament or wire. Using a filament or wire to implement ionizing electrode 6 is not intended to limit the scope of various embodiments disclosed herein. One of ordinary skill in the art would readily recognize other shapes may be used when implementing ionizing electrode 6, such as an electrode having a sharp point or a small tip radius, a set of more than one sharp point, a loop-shaped wire or equivalent ionizing electrode.

Figure 2A:
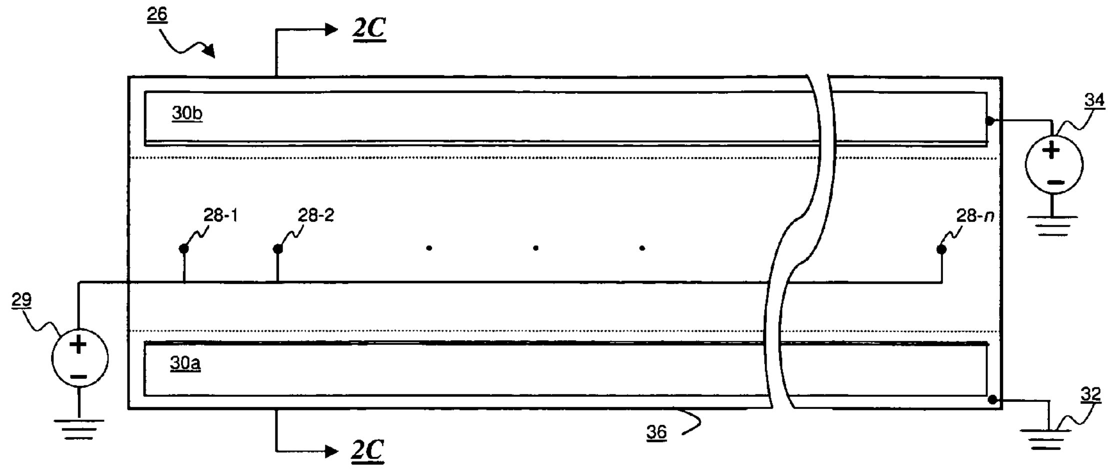
FIGS. 2A-2B are top and bottom views, respectively, in block illustration form of an ionizing cell in accordance with another embodiment of the present invention.
Figure 2B:
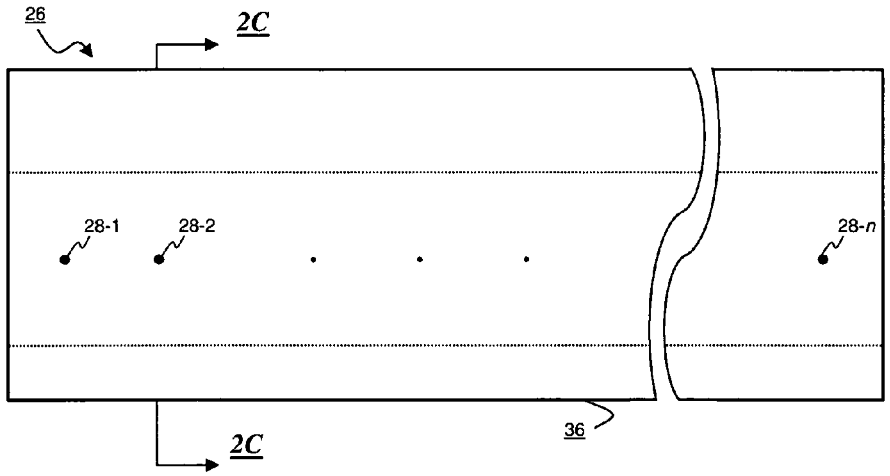
Figure 2C:
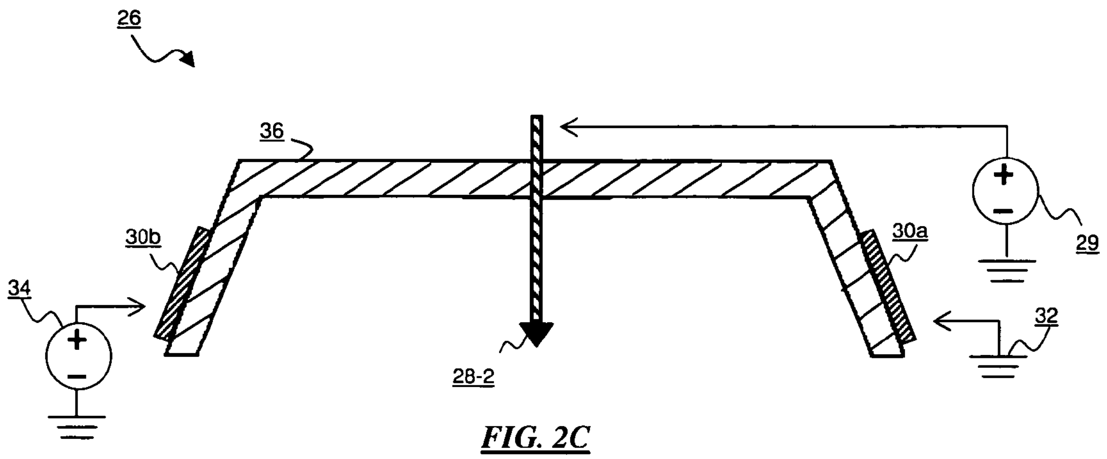
FIG. 2C is a sectional view along line 2C-2C of the ionizing cell illustrated in FIGS. 2A-2B.

For example, referring to FIGS. 2A through 2C, an ionizing cell 26 having a set of ionizing electrodes 28-1 through 28-*n*, that each have a sharp point, where n represents the maximum number of ionizing electrodes defined in the set, and that receive a multi-frequency voltage 29, may employed in another embodiment of the present invention. Ionizing cell 26 also includes electrodes 30*a* and 30*b* for receiving respectively a reference voltage 32, such as ground, and an ion balancing voltage 34; and a structure 36 that provides a mechanical and electrically insulating support for ionizing electrodes 28-1 through 28-*n* and reference electrodes 30*a* and 30*b*. Ionizing cell 26, ionizing electrodes 28-1 through 28-*n*, multi-frequency voltage 29, electrodes 30*a* and 30*b*, reference voltage 32, ion balancing voltage 34 and structure 36 respectively have substantially the same function and if applicable, the same structure as ionizing cell 4, ionizing electrode 6, multi-frequency voltage 8, electrodes 10*a* and 10*b*, reference voltage 12, ion balancing voltage 34 and structure 16.

Referring again to FIGS. 1A through 1C, reference electrodes 10*a* and 10*b* each have a relatively flat surface and are located outside of structure 16, such on outer side walls 42*a* and 42*b*, respectively. Using a pair of reference electrodes or a relatively flat surface for reference electrodes 10*a* and 10*b* is not intended to limit the various embodiments disclosed. In addition, those of ordinary skill in the art would readily recognize after receiving the benefit of this disclosure that other shapes may also be used for reference electrodes 10*a* and 10*b*, including a shape having a cross-section similar to that of a circle or semi-circle (not shown).

A reference electrode may be placed at a distance from ionizing electrode 6 in the range of 5E-3 m to 5E-2 m. For example, since ionizing cell 4 utilizes a pair of reference electrodes 10*a* and 10*b*, which are respectively located at a distance 44*a* and a distance 44*b* in the range of 5E-3 m to 5E-2 m from ionizing electrode 6.

Electrodes 6, 10*a* and 10*b* may be placed at a location near an electro-statically charged object 38 having a surface charge 40 by using structure 16 to set object distance 46 in the range in which available neutralizing ions may be displaced or directed effectively towards surface charge 40. This effective range is currently contemplated to be from a few multiples of the distance between an ionizing electrode and a reference electrode, such as the dimensions defined by distances 44*a* or 44*b*, up to 100 inches although this range is not intended to be limiting in any way. Structure 16 should be electrically non-conductive and insulating to an extent that its dielectric properties would minimally affect the creation and displacement of ions as disclosed herein. The dielectric properties of structure 16 may be in the range of resistance of between 1E11 to 1E15Ω and have a dielectric constant of between 2 and 5. Object distance 46 is defined as the shortest distance between the closest edges of an ionizing electrode and of an object intended for static neutralization, such as ionizing electrode 6 and charged object 38, respectively.

Figure 3A:
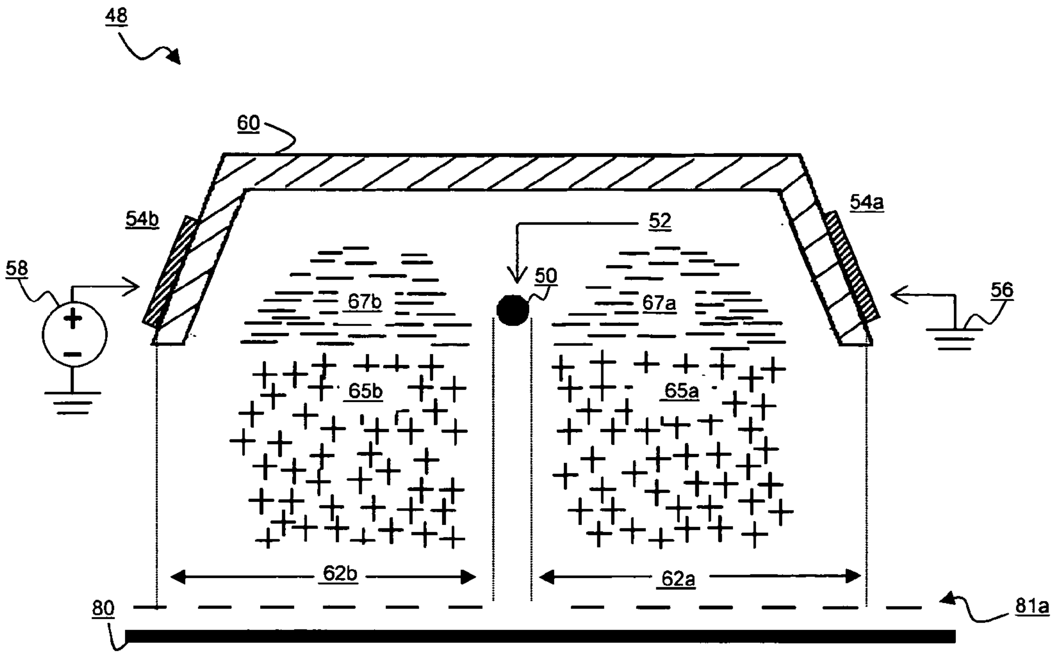
FIGS. 3A-3B illustrate the creation and polarization of ion clouds in accordance with yet another embodiment of the present invention.
Figure 3B:
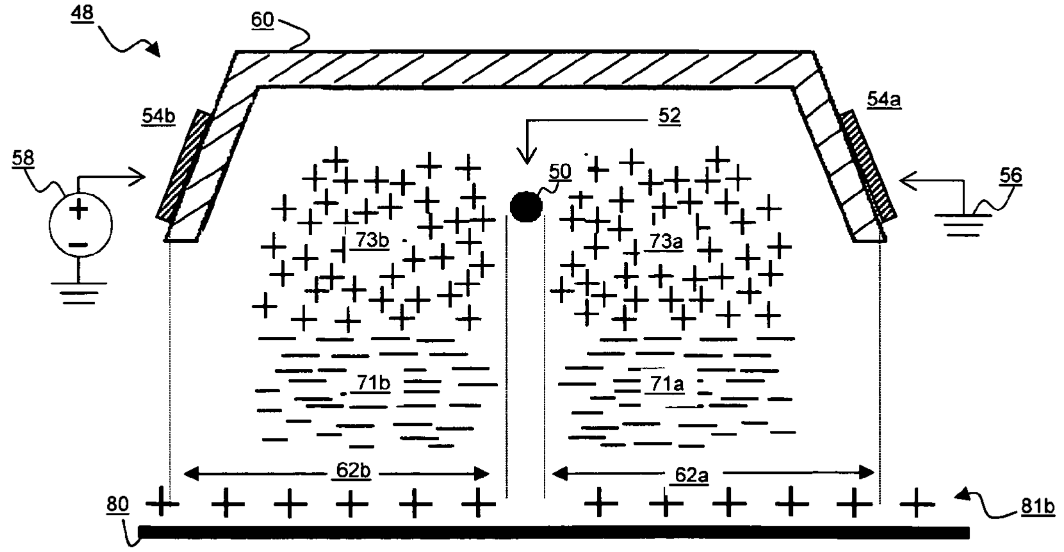
Figure 3C:
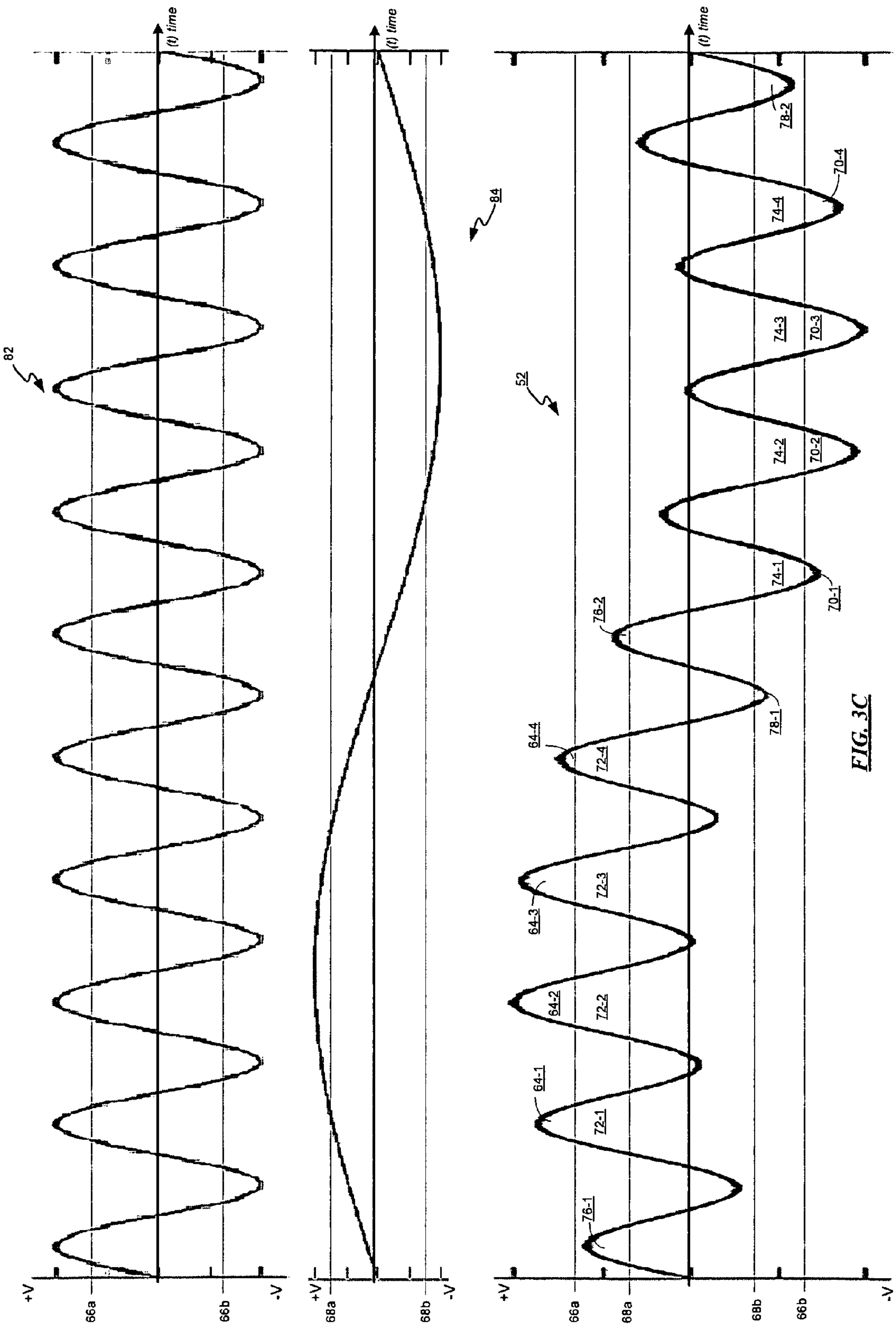
FIG. 3C illustrates a multi-frequency voltage formed by combining a first component voltage and a second component voltage in accordance with yet another embodiment of the present invention.

FIGS. 3A-3C illustrate the effect of using a multi-frequency voltage to create and to redistribute or polarize an alternating bipolar ion cloud over a given time period in accordance with another embodiment of the present invention. FIGS. 3A and 3B include sectional illustrations of an ionizing cell 48 having substantially the same elements and function as ionizing cell 4 described above and include an ionizing electrode 50 for receiving a multi-frequency voltage 52, reference electrodes 54*a* and 54*b* for receiving a reference voltage 56, such as ground, and an ion balancing voltage 58, respectively, and a structure 60. Ionizing cell 48, reference electrodes 54*a* and 54*b*, reference voltage 56, ion balancing voltage 58 and structure 60 have substantially the same function and if applicable, the same structure as ionizing cell 4, electrodes 10*a* and 10*b*, reference voltage 12, ion balancing voltage 34 and structure 16, respectively.

The two closest respective edges of ionizing electrode 50 and reference electrode 52*a* defines distance 62*a*, the two closest respective edges of ionizing electrode 50 and reference electrode 52*b* defines distance 62*b*. Distance 62*a* and distance 62*b* are substantially equal in the embodiment shown.

As shown in FIG. 3C, multi-frequency voltage 52 has a waveform that includes during at least one frequency period, a first time-voltage region, a second time-voltage region and a third time-voltage region. First time-voltage region describes a waveform area representing the voltage amplitude of multi-frequency voltage 52 for a given time period in which either positive or negative ions are created by corona discharge and are redistributed according to the polarity of the created ions and the polarity of multi-frequency voltage 52 while in the first time-voltage region.

For example, as shown in FIGS. 3A and 3C, when in any of first time-voltage regions 64-1 through 64-4, multi-frequency voltage 52 has a positive voltage exceeding a positive corona onset voltage threshold 66*a* and a positive polarization threshold voltage 68*a* for ionizing cell 48 during a given time period. Multi-frequency voltage 52 thus creates positive ions by corona discharge within distances 62*a* and 62*b*. Also, while in first time-voltage regions 64-1 through 64-4, multi-frequency voltage 52 redistributes ions because the positive polarizing field created by multi-frequency voltage 52 within distances 62*a* and 62*b* attracts negative ions 67*a* and 67*b* and repels positive ions 65*a* and 65*b*. First time-voltage regions in which a multi-frequency voltage 52 has a positive voltage, such as first time-voltage regions 64-1 through 64-4, may be hereinafter referred to as positive first time-voltage regions.

The term "polarizing field" is defined as an electrical field created between an ionizing electrode, such as ionizing electrode 50, and a reference electrode, such as reference electrode 54*a*, reference electrode 54*b* or both, that has sufficient charge to redistribute positive and negative ions, which are in the space between the ionizing electrode and the reference electrode(s), into separate regions according to the polarity of the ions, such as distances 62*a* and 62*b*. Redistributing ions increases the effective range in which available ions may be displaced or directed towards a charged object 80 without the use of a stream of gas or other means. Polarizing fields are not shown to avoid overcomplicating the herein disclosure. Charged object 80 is depicted to have a region having a negative charge 81*a*.

The term "polarization threshold voltage" is defined to mean a voltage amplitude, measured between an ionizing electrode and a reference electrode, that when exceeded creates a positive or negative electrical field of sufficient intensity to redistribute positive and negative ions available in the space between an ionizing electrode and a reference electrode.

As shown in FIGS. 3B and 3C, when in any of first time-voltage regions 70-1 through 70-4, multi-frequency voltage 52 has a negative voltage exceeding a negative corona onset voltage threshold 66*b* and a negative polarization threshold voltage 68*b* for ionizing cell 48 during a given time period. Multi-frequency voltage 52 thus creates negative ions 71*a* and 71*b* by corona discharge within distances 62*a* and 62*b*. Also, while in first time-voltage region 70-1 through 70-4, multi-frequency voltage 52 redistributes ions because the negative polarizing field created by multi-frequency voltage 52 within distances 62*a* and 62*b* attracts positive ions 73*a* and 73*b* and repels negative ions 71*a* and 71*b*. First time-voltage regions in which a multi-frequency voltage 52 has a negative voltage, such as first time-voltage regions 70-1 through 70-4, may be hereinafter referred to as negative first time-voltage regions. Charged object 80 is depicted to have a region having a positive charge 81*b*.

Ions created by corona discharge do not dissipate immediately by recombination but have a certain lifetime, which is approximately within one to sixty (60) seconds in clean gas or air after the corona discharge ends. Negative ions, such as negative ions 67*a* and 67*b*, redistributed in a positive first time-voltage region, such as in first time-voltage region 64-1, 64-2, 64-3 or 64-4, are negative ions previously created that have not yet recombined with positive ions or been neutralized by a charged object. Alternatively, positive ions, such as positive ions 73*a* and 73*b*, redistributed in a negative first time-voltage region, such as in first time-voltage region 70-1, 70-2, 70-3 or 70-4, are positive ions previously created that have not yet recombined with positive ions or been neutralized by a charged object.

The second time-voltage region describes a waveform area representing the voltage amplitude of multi-frequency voltage 52 for a given time period that is adjacent in time to, overlaps or both, the time period of a first time-voltage region and during which available ions are redistributed according to the polarity of the created ions and the polarity of the polarizing field created by multi-frequency voltage 52. Also, while in the second time-voltage region, multi-frequency voltage 52 does not exceed the positive or negative corona onset threshold voltages. For example, in FIGS. 3A and 3C, when in any of second time-voltage regions 72-1 through 72-4, multi-frequency voltage 52 has a positive voltage exceeding positive polarization threshold voltage 68*a* but not exceeding positive corona onset voltage threshold 66*a* for ionizing cell 48. Thus, while in second time-voltage region 74-1 through 74-4, multi-frequency voltage 52 redistributes ions previously created and available within distances 62*a* and 62*b* by attracting negative ions 75*a* and 75*b* and repelling positive ions 77*a* and 77*b*. Second time-voltage regions in which a multi-frequency voltage 52 has a positive voltage, such as second time-voltage regions 72-1 through 72-4, may be hereinafter referred to as positive second time-voltage regions.

Similarly, as seen in FIGS. 3B and 3C, when in any of second time-voltage regions 74-1 through 74-4, multi-frequency voltage 52 has a negative voltage exceeding negative polarization threshold voltage 68*b* but not exceeding negative corona onset voltage threshold 66*b* for ionizing cell 48. Thus, while in second time-voltage region 74-1 through 74-4, multi-frequency voltage 52 redistributes ions previously created and available within distances 62*a* and 62*b* by creating a polarizing filed that repels negative ions 79*a* and 79*b* and attracts positive ions 81*a* and 81*b*. Second time-voltage regions in which a multi-frequency voltage 52 has a negative voltage, such as second time-voltage regions 74-1 through 74-4, may be hereinafter referred to as negative second time-voltage regions.

The third time-voltage region describes a waveform area representing the voltage amplitude of multi-frequency voltage 52 for a given time period that neither abuts in time nor overlaps the time period of a first time-voltage region and during which available ions are redistributed according to the polarity of the created ions and the polarity of the polarizing field created by multi-frequency voltage 52. For example in FIGS. 3A and 3C, when in any of third time-voltage regions 76-1 through 76-2, multi-frequency voltage 52 has a positive voltage exceeding positive polarization threshold voltage 68*a* but not exceeding positive corona onset voltage threshold 66*a* for ionizing cell 48. Thus, while in third time-voltage regions 76-1 or 76-2, multi-frequency voltage 52 redistributes ions available within distances 62*a* and 62*b* by creating a positive polarizing field that attracts negative ions and repels positive ions. In addition, since in this example, charged object 80 has negative charge 81*a*, the positive ions are also attracted to charged object 80 by negative charge 81*a*, further increasing the range and efficiency by which neutralizing ions can be dispersed toward charged object 80. Third time-voltage regions in which a multi-frequency voltage 52 has a positive voltage, such as third time-voltage regions 76-1 and 76-2, may be hereinafter referred to as positive third time-voltage regions.

In another example and in reference to FIGS. 3B and 3C, when in any of third time-voltage regions 78-1 and 78-2, multi-frequency voltage 52 has negative voltage exceeding negative polarization threshold voltage 68*b* but not exceeding negative corona onset voltage threshold 66*b* for ionizing cell 48. Thus, while in third time-voltage region 78-1 or 78-2, multi-frequency voltage 52 redistributes ions previously created and available within distances 62*a* and 62*b* by creating a negative polarizing field that repels negative ions 83*a* and 83*b* and attracts positive ions 85*a* and 85*b*. In addition, since charged object 80 has positive charge 81*b*, the negative ions are also attracted to charged object 80 by positive charge 81*b*, further increasing the range and efficiency by which neutralizing ions can be dispersed toward charged object 80. Third time-voltage regions in which a multi-frequency voltage 52 has a negative voltage, such as third time-voltage regions 78-1 and 78-2, may be hereinafter referred to as negative third time-voltage regions.

Multi-frequency voltage 52 may be created by summing or combining at least two alternating voltages with one of the alternating voltages having a relatively high frequency and the other having a relatively low frequency. For example, referring to FIG. 3C, multi-frequency voltage 52 is created from the sum of a first voltage component 82 and a second voltage component 84. First voltage component 82 has an alternating frequency in the range of approximately 1 kHz to 30 kHz, preferably between 2 kHz and 18 kHz, while second voltage component 84 has an alternating frequency in the range of approximately 0.1 Hz to 500 Hz, although preferably between 0.1 Hz and 100 Hz.

First voltage component 82 also includes relatively high amplitude voltages that, when combined with second voltage component 84, exceed during certain time periods the positive or negative corona onset threshold voltage required to generate ions by corona discharge in an ionizing cell. In the embodiment of the present invention shown in FIG. 3C, first voltage component 82 includes voltage amplitudes greater than the corona onset threshold voltage of ionizing cell 48, while second voltage component 84 includes voltage amplitudes greater than the polarization threshold voltage of the ionizing cell. However, one of ordinary skill in the art would readily recognize that the voltage amplitudes of first and of second voltage components 82 and 84 do not individually have to exceed the respective corona onset and polarization threshold voltages of ionizing cell 48 but when combined is sufficient to create a multi-frequency voltage that includes voltage amplitudes exceeding either the corona onset threshold voltage, polarization threshold voltage or both of an ionizing cell, such as ionizing cell 48.

The polarizing effectiveness of multi-frequency voltage 52 when used in an ionizing cell is dependent on many factors, including the shape and position of the ionizing electrode used and the position of the weighted center of the bipolar ion cloud within the distance between an ionizing electrode and a reference electrode, such as distance 62*a* or 62*b*. In the embodiment shown in FIGS. 3A through 3F, aligning the weighted center of the bipolar ion clouds created during corona discharge within the approximate middle of distances 62*a* and 62*b* maximizes the ion polarization of the bipolar ion clouds.

First voltage component 82 of multi-frequency voltage 52 causes ions comprising a bipolar ion cloud to oscillate between an ionizing electrode and a reference electrode, such as between ionizing electrode 50 and reference electrode 54*a* and between ionizing electrode 50 and reference electrode 54*b*. Further details may be found in U.S. patent application, having Ser. No. 10/821,773, entitled "Ion Generation Method and Apparatus", hereinafter referred to as the "patent".

Respectively positioning the weighted center of bipolar ion cloud within distance 62*a* or distance 62*b* may be accomplished by empirical means or by using the following equation, which is also taught in the patent:

$$V(t)=\mu*F(t)/G2 \quad [1]$$

where V(t) is the voltage difference between ionizing electrode 50 and a reference electrode, such as reference electrode 54*a* or 54*b*, μ is the average mobility of positive and negative ions, F(t) is the frequency of multi-frequency voltage 52 and G is equal to the size of the distance, such as distance 62*a* or 62*b*, between ionizing electrode 50 and a reference electrode, such as reference electrode 54*a* or 54*b*, respectively.

Equation [1] characterizes, among other things, the relationship of the voltage and frequency of an ionizing voltage with the position of the weighted center of a bipolar ion cloud within the distance formed between an ionizing and a reference electrode, such as distance 62*a*, which is formed between ionizing electrode 50 and reference electrode 54*a* and distance 62*a*, which is formed between ionizing electrode 50 and reference electrode 54*b*.

Positioning the weighted center of a bipolar ion cloud approximately between an ionizing electrode and a reference electrode enhances the polarization effectiveness of a multi-frequency voltage, such as multi-frequency voltage 52. This positioning may be accomplished by adjusting the amplitude, frequency or both, of first voltage component 82. However, it has been found that the most convenient method of adjusting the position of a bipolar ion cloud is by adjusting the amplitude of first voltage component 82, while keeping the distance between the ionizing electrode and a reference electrode in the range of 5E-3 m and 5E-2 m and the frequency of first voltage component 82 in the range 1 kHz and 30 kHz, and assuming an average light ion mobility in the range of 1E-4 to 2E-4 [m2/V*s] at 1 atmospheric pressure and a temperature of 21 degrees Celsius.

Although equation [1] characterizes an ionizing cell having an ionizing electrode and a reference electrode that is relatively flat, one of ordinary skill in the art after reviewing this disclosure and the above referred United States patent application would recognize that the centered position of an oscillating bipolar ion cloud can be characterized using the above mentioned variables for other configurations and/or shapes of an ionizing electrode and reference electrode(s).

Second voltage component 84 may also include a DC offset (not shown) for balancing the number of positive and negative ions generated. A positive DC offset increases the number of positive ions generated, while a negative DC offset increases the number of negative ions generated. For example, adding a positive DC offset to second voltage component 84 causes second voltage component 84 to have an alternating asymmetrical waveform, which in turn will cause multi-frequency voltage 52 to remain generally at a longer period of time above corona onset and polarization threshold voltages 66*a* and 68*a*, respectively, and to remain for a shorter period of below corona onset and polarization threshold voltages 66*b* and 68*b*, respectively, than multi-frequency voltage 52 would have if second voltage component 84 did not have a DC offset. Alternatively, providing a negative DC offset to second voltage component 84 causes second voltage component 84 to have also an alternating asymmetrical waveform, which in turn will cause multi-frequency voltage 52 to remain generally at a shorter period of time above corona onset and polarization threshold voltages 66*a* and 68*b*, respectively, and to remain for a longer period of below corona onset and polarization threshold voltages 66*b* and 68*b*, respectively, than multi-frequency voltage 52 would have if second voltage component 84 did not have a DC offset. The combined peak voltage amplitude and maximum DC offset for second voltage component 84 may be less than the threshold voltage that will create a corona discharge for a particular ionizing cell, which in the embodiment disclosed herein, is typically within +/−10 to 3000V.

Figure 4:
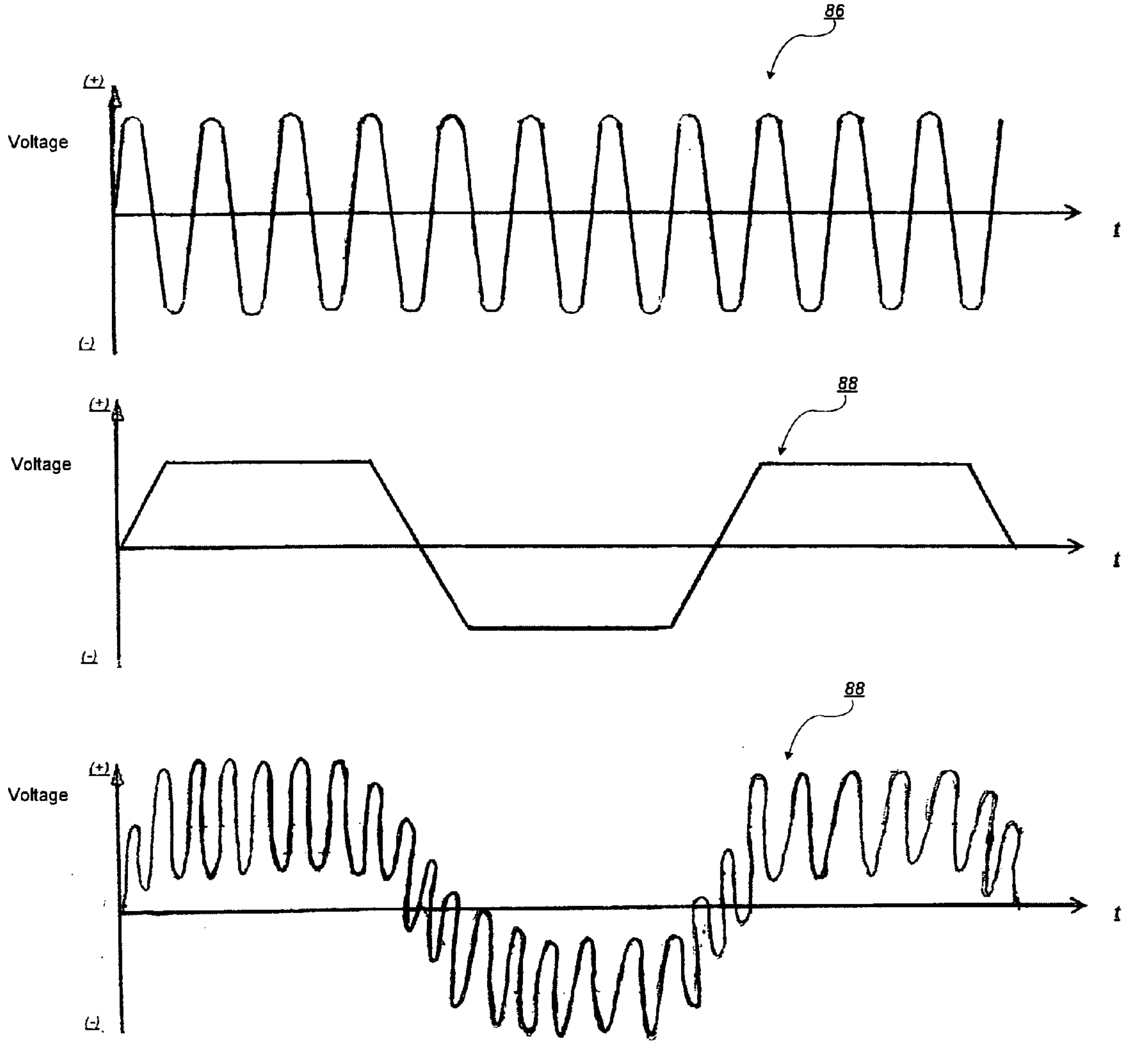
FIG. 4 illustrates a multi-frequency voltage formed by combining first and second component voltages in accordance with yet another embodiment of the present invention.

Still referring to the example shown in FIG. 3C, first voltage component 82 and second voltage component 84 that have sinusoidal waveforms that start at a phase value of 0 degrees. The use of sinusoidal waveforms or waveforms that are in phase with each other is not intended to be limiting in any way. Other starting phase values and types of waveforms, such as trapezoidal, non-sinusoidal, pulse, saw tooth, square wave, triangular and other types of waveforms, and may be used and in different combinations. For example, referring to FIG. 4, a first voltage component 86 having a sinusoidal waveform may be combined with a second voltage component 88 having a trapezoidal waveform to form a multi-frequency voltage 90.

Figure 5:
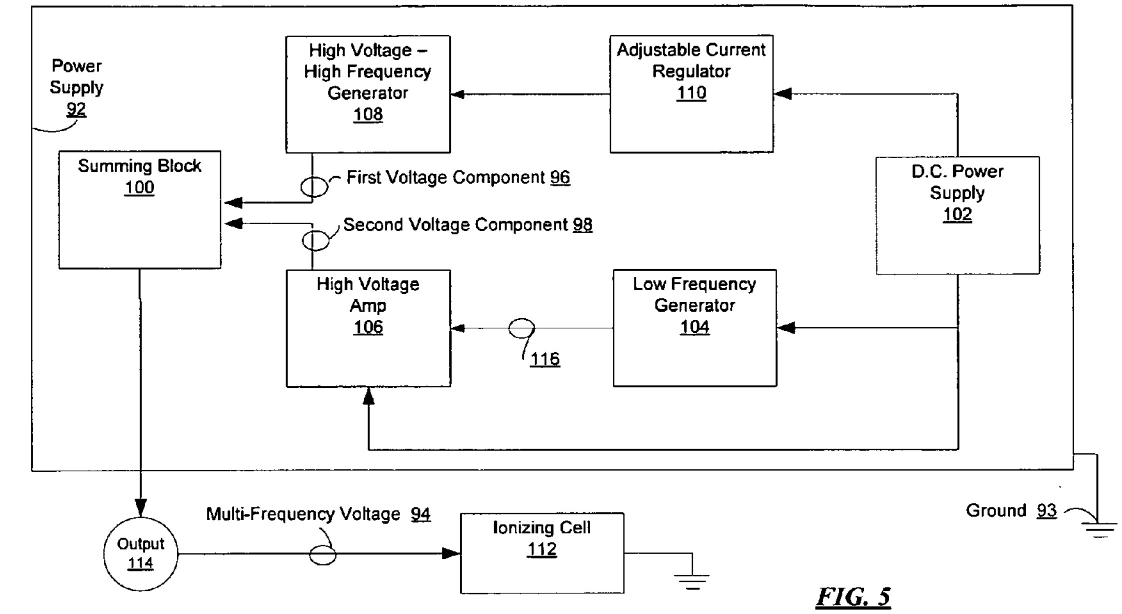
FIG. 5 is a block diagram of a power supply in accordance with another embodiment of the present invention.

Referring now to FIG. 5, power supply 92 may be used to generate a multi-frequency voltage 94 by combining a first voltage component 96 and a second voltage component 98 using a summing block 100. Power supply 92 includes a DC power supply 102 electrically coupled to a low frequency generator 104, a high voltage amplifier 106 and a high voltage-high frequency generator 108 via an adjustable current regulator 110. Power supply 92 may be used with an ionizing cell 112 having substantially the same elements and function as ionizing cell 6, 26 or 48. Power supply 92 also includes an output 114 coupled to at least one ionizing electrode (not shown) of ionizing cell 112, enabling power supply 92 to provide multi-frequency voltage 94 to the ionizing electrode during operation. Power supply 92 also provides a reference voltage 93, which in the embodiment shown in FIG. 65 is in the form of ground.

Low frequency generator 104 and high voltage amplifier 106 receive current and voltage from DC power supply 102. Low frequency generator 104 generates an alternating output signal 116 having a frequency in the range of 0.1 and 500 Hz, preferably between 0.1 and 100 Hz. High voltage amplifier 106 generates second voltage component 98 by receiving and amplifying alternating output signal 116 to a voltage amplitude of between 10 and 4000 volts. High voltage amplifier 106 may also provide an adjustable DC offset voltage in the range of +/−10 and 500 volts. It is contemplated that the maximum amplitude provided by high voltage amplifier 106 for second voltage component 98 is less than the corona onset threshold voltage for ionizing cell 112 and less than the maximum voltage amplitude selected for first voltage component 96.

High voltage-high frequency generator 108 generates first voltage component 96 and includes an adjustment for selecting the frequency of first voltage component 96. The voltage amplitude of high voltage-high frequency generator 106 is selectable by adjusting the amount of current provided by adjustable current regulator 110 to first voltage component 96. In accordance with one embodiment of the present invention, the position of the weighted center of an ion cloud generated using ionizing cell 112 and multi-frequency voltage 94 may be selected by adjusting the frequency output of high voltage-high frequency amplifier 96 and then fine tuning the position of the weighted center of the ion cloud by adjusting the voltage amplitude of first voltage component 96 by adjusting the amount of current provided by adjustable current regulator to high frequency-high voltage generator 108.

Since summing block 100 combines first and second voltage components 96 and 98 to generate multi-frequency voltage 94, the form of multi-frequency voltage 94 is dependent substantially on the form of first voltage component 94 and second component voltage 96. For example, power supply 92 may be used to generate multi-frequency voltage 52, disclosed above with reference to FIG. 3C, if first and second voltage components 96 and 98 are in the form of first and second voltage components 82 and 84, respectively. Similarly, power supply 92 may be used to generate multi-frequency voltage 90, disclosed above with reference to FIG. 6, if first and second voltage components 96 and 98 are substantially in the form of first and second voltage components 86 and 88, respectively.

Figure 6:
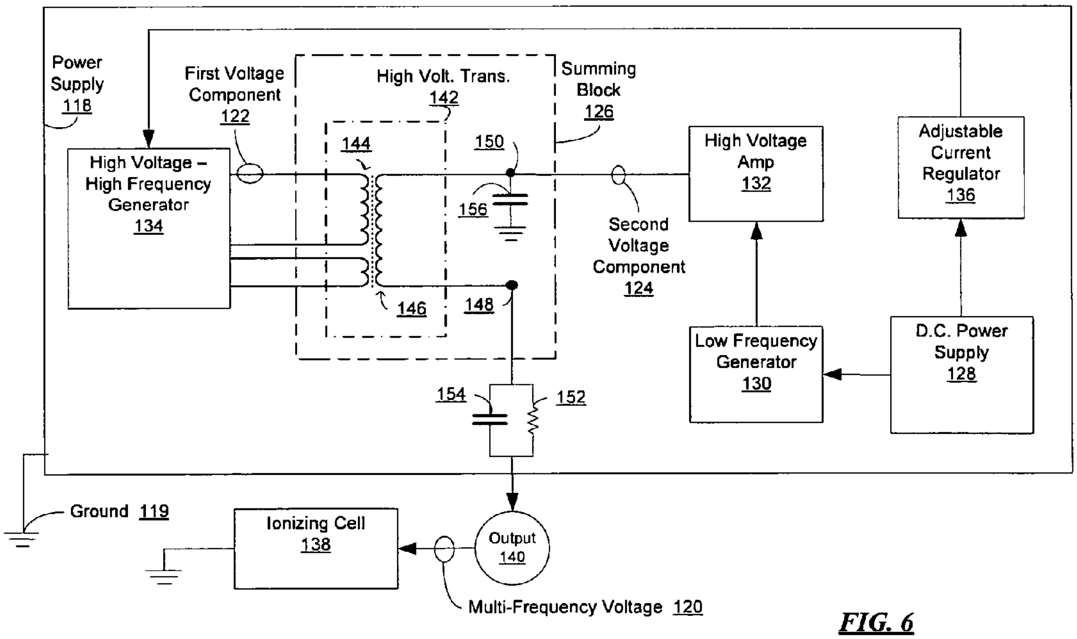
FIG. 6 is a block diagram of a power supply in accordance with another embodiment of the present invention.

FIG. 6 is a simplified block diagram of a power supply 118 in accordance with another embodiment of the present invention. Like power supply 92 in FIG. 5, power supply 118 provides a multi-frequency voltage 120 by combining a first voltage component 122 and a second voltage component 124 using a summing block 126. Power supply 118 includes a DC power supply 128 electrically coupled to a low frequency generator 130, a high voltage amplifier 132 and a high voltage-high frequency generator 134 via an adjustable current regulator 136. Power supply 118 may be used with an ionizing cell 138 having substantially the same elements and function as ionizing cell 6, 26 or 48. Power supply 118 also includes an output 140 coupled to at least one ionizing electrode (not shown) of ionizing cell 138, enabling power supply 118 to provide multi-frequency voltage 120 to the ionizing electrode during operation. Power supply 118 also provides a reference voltage 119, which in the embodiment shown in FIG. 6 is in the form of ground.

Summing block 126 is implemented using a high voltage transformer 142, low and high pass filters and virtual and physical grounds. In the example shown, the outputs of high voltage-high frequency generator 134 and high voltage amplifier 132 are electrically coupled to high voltage transformer 142, which has a primary coil 144 for receiving a high voltage-high frequency signal from high voltage-high frequency generator 134 and a secondary coil 146 having a first terminal 148 and a second terminal 150.

First terminal 148 couples to low pass filter 152 and high pass filter 154, which in combination electrically decouple ionizing cell 138 from power supply 118 during static neutralization. Low pass filter 152 may be implemented by using a resistor having a value that provides a relatively low resistance to low frequency current and high resistance to high frequency current, such as a resistor having a value in the range of approximately 1 and 100 MΩ, preferably in the range of approximately 5 and 10 MΩ. High pass filter 154 may be implemented by using a capacitor having a value that provides a relatively low resistance to high frequency current and relatively high resistance to low frequency current, such as a capacitor having a value in the range of approximately 20 pF and 1000 pF, preferably in the range of approximately 200 pF and 500 pF. With respect to the embodiment shown in FIG. 6, the terms "low frequency" and "high frequency" are respectively currently contemplated to be in the approximate range of 0.1 Hz and 500 Hz, and in the range of 1 Hz and 30 Hz. In accordance with another embodiment of the present invention, the term "low frequency" is a frequency in the approximate range of 0.1 Hz and 100 Hz, which the term "high frequency" is a frequency in the approximate range of 2 kHz and 18 kHz.

Second terminal 150 is coupled to the output of high voltage amplifier 132 and to a "virtual ground" circuit 156, which is implemented in the form of a capacitor. Circuit 154 is referred to as a virtual ground circuit because it functions as an open circuit for low frequency high voltage generated by the combination of high voltage amplifier 132 and low frequency generator 130, but also functions as a grounding circuit for any high voltage-high frequency voltage induced on secondary coil 146.

In an alternative embodiment, high voltage-high frequency generator 118 is implemented using a Royer-type high voltage frequency generator having a high frequency transformer that includes a primary coil and a secondary coil. This high frequency transformer may be used to implement high voltage transformer 142, reducing the cost of implementing power supply 134 and eliminating the need to provide high voltage transformer 142.

While the present invention has been described in particular embodiments, it should be appreciated that the present invention should not be construed as limited by such embodiments. Rather, the present invention should be construed according to the claims below.

We claim:

1. An apparatus for neutralizing an electro-statically charged object, comprising:

a power supply including a multi-frequency voltage output and a reference voltage output, said power supply disposed to generate a multi-frequency voltage and to provide said multi-frequency voltage through said multi-frequency voltage output;

an ionizing cell having an ionizing electrode and a reference electrode, said ionizing electrode disposed to receive a multi-frequency voltage through said multi-frequency voltage output, and said reference electrode coupled to said reference voltage output and separated from said ionizing electrode by a first distance; and wherein, in response to the application of said multi-frequency voltage on said ionizing electrode, said multi-frequency voltage creates an oscillating ion cloud having positive ions and negative ions upon reaching a corona onset voltage threshold of said ionizing cell; and said multi-frequency voltage redistributes said positive and negative ions into separate regions when said multi-frequency voltage creates a polarizing electrical field of sufficient strength to increase the effective range in which positive or negative ions from said ion cloud may be displaced or directed towards the electro-statically charged object.

2. The apparatus of claim 1, wherein:

said multi-frequency voltage having a waveform that includes a first time-voltage region, a second time-voltage region and a third time-voltage region;

said multi-frequency voltage simultaneously creating said positive and negative ions and redistributing said positive and negative ions when said multi-frequency voltage is within said first time-voltage region;

said multi-frequency voltage redistributing said positive and negative ions when within said second time-voltage region, said second time-voltage region having a time value adjacent in time to said first time-voltage region; and said multi-frequency voltage redistributing said positive and negative ions when within said third time-voltage region, said third time-voltage region having a time value not adjacent in time to said first time-voltage region.

3. The apparatus of claim 2, wherein:

said first time-voltage region is bounded by a voltage amplitude of said multi-frequency voltage sufficient to create said oscillating ion cloud between said ionizing and said reference electrodes by corona discharge; and said second and said third time-voltage regions are respectively bounded by a voltage amplitude of said multi-frequency voltage that is sufficient to create said polarizing electrical field between said ionizing and said reference electrodes but insufficient to initiate a corona discharge between said ionizing and said reference electrodes.

4. The apparatus of claim 1, wherein said power supply further includes a summing block that creates said multi-frequency voltage by adding a first alternating voltage component and a second alternating voltage component, said first alternating voltage component having a first voltage amplitude varying at a first frequency and said second alternating voltage component having a second voltage amplitude varying at a second frequency.

5. The apparatus of claim 4, wherein said multi-frequency voltage has a voltage amplitude equal to the sum of said first voltage amplitude and said second voltage amplitude.

6. The apparatus of claim 1, wherein said multi-frequency voltage is equal to the sum of a first alternating voltage component and a second alternating voltage component; and said first alternating voltage component having a first voltage amplitude varying at a first frequency and said second alternating voltage component having a second voltage amplitude varying at a second frequency.

7. The apparatus of claim 4, wherein:

said ion cloud includes a weighted center located between said ionizing electrode and said reference electrode; and said first frequency disposed with a value that causes said weighted center of said ion cloud to be positioned at the approximate center of said first distance.

8. The apparatus of claim 4, wherein:

said ion cloud includes a weighted center located at a selected position between said ionizing electrode and said reference electrode;

said voltage amplitude reaches a voltage sufficient to induce a corona discharge between said ionizing electrode and said reference electrode at least once during any single cycle of said second frequency; and said first voltage amplitude for causing said weighted center of said ion cloud to be positioned at the approximate center of said first distance.

9. The apparatus of claim 4, wherein:

said ion cloud includes a weighted center located at a selected position between said ionizing electrode and said reference electrode first voltage amplitude;

said voltage amplitude reaches a voltage sufficient to induce a corona discharge between said ionizing electrode and said reference electrode at least once within a single cycle of said second frequency; and said first frequency having a value that causes said selected position to be positioned at the approximate center of said first distance.

10. The apparatus of claim 6, wherein:

said ion cloud includes a weighted center located between said ionizing electrode and said reference electrode first voltage amplitude; and said first voltage amplitude and said first frequency disposed to cause said weighted center of said ion cloud to be positioned at the approximate center of said first distance, said first frequency and said first voltage amplitude defined by the equation:

$$V(t)=u*F(t)/G^2$$

where u is the average ion mobility of said positive and negative ions, F(t) is said first frequency, V(t) is said first voltage amplitude and G is said selected dimension of said first distance.

11. The apparatus of claim 4, wherein said first and said second voltage amplitudes do not individually reach a corona discharge threshold voltage for said ionization cell and wherein a sum of said first and said voltage amplitudes exceeds said corona discharge threshold voltage during a given time period.

12. The apparatus of claim 11, wherein said first frequency is greater than said second frequency.

13. The apparatus of claim 11, wherein said first frequency is in the range of 1 kHz to 30 kHz and said second frequency is in the range of 0.1 Hz and 500 Hz.

14. The apparatus of claim 11, wherein said second alternating voltage component has a non-sinusoidal waveform.

15. The apparatus of claim 11, wherein said second alternating voltage component has an approximately trapezoidal waveform.

16. The apparatus of claim 11, wherein said second alternating voltage component has an approximately square wave waveform.

17. The apparatus of claim 11, wherein said second alternating voltage component has a sinusoidal waveform.

18. The apparatus of claim 11, wherein said second alternating voltage component includes unequal maximum positive and negative voltages.

19. The apparatus of claim 1, wherein said ionizing electrode has a shape in the form of a wire.

20. The apparatus of claim 1, wherein said ionizing electrode has shape in the form of wire configured as a loop.

21. The apparatus of claim 1, wherein ionizing electrode includes a tapered end terminating in the shape of a point.

22. The apparatus of claim 1, wherein said redistribution of said ion cloud causes a portion of said positive and said negative ions to disperse closer to the charged object.

23. The apparatus of claim 1, further including a second reference electrode coupled to said reference voltage output, said second reference electrode separated from said ionizing electrode by a second distance.

24. The apparatus of claim 1, further including another electrode for receiving an ion balancing voltage.

25. The apparatus of claim 24, wherein said ion balance voltage is substantially a direct current voltage and selected to have a value that results in a balanced ion flow of said positive ions and said negative ions.

26. The apparatus of claim 24, wherein said another electrode is coupled to a circuit that maintains a selected ion current in the ionization cell during the creation of said ion cloud.

27. The apparatus of claim 24, wherein said another electrode is coupled to circuit for maintaining an approximately equal amount of said positive ions and said negative ions during the creation of said ion cloud.

28. The apparatus of claim 1, said power supply further including:

a high voltage summing block having an output, a first input and a second input, said output coupled to said ionizing electrode;

a first high voltage generator having a first generator output coupled to said first input, a second high voltage generator having a second generator output coupled to said second input; and said high voltage summing block converts voltages received from first generator and said second generator into said multi-frequency voltage.

29. The apparatus of claim 28, wherein said first generator generates a first signal having a first frequency; and said second generator generates a second signal having a second frequency.

30. An apparatus for neutralizing an electro-statically charged object located at a first position, comprising:

a module having a ionizing electrode and a reference electrode spaced a part across a first distance of a selected dimension; and a source of multi-frequency voltage coupled to said ionizing electrode and to said reference electrode, said multi-frequency voltage for creating an ion cloud that has positive ions, negative ions and a weighted center located at a selected position within said first distance; and said multi-frequency voltage for redistributing said positive and negative ions.

31. The apparatus of claim 30, wherein said source includes:

a reference voltage output coupled to said reference electrode;

a high voltage combining device having an output, a first input and a second input, said output coupled to said ionizing electrode;

a first high voltage generator having a first generator output coupled to said first input;

a second high voltage generator having a second generator output coupled to said second input; and wherein said high voltage combining device creates said multi-frequency voltage by summing a first voltage and a second voltage generated by said first generator and said second generator, respectively.

32. The apparatus of claim 31, wherein said first voltage includes a first frequency and a first amplitude; and wherein said first amplitude and said first frequency disposed for causing said weighted center of said ion cloud to be positioned at the approximate center of said first distance, said first frequency and said first amplitude defined by the equation:

$$V=u*F/G^2$$

where u is the average ion mobility of said positive and negative ions, F is said first frequency, V is said first amplitude and G is said selected dimension of said first distance.

33. The apparatus of claim 31, wherein:

said first voltage includes a first frequency and a first amplitude;

said first frequency having a voltage amplitude range sufficient to induce a corona discharge within said first distance; and said first voltage further includes a first amplitude is disposed to cause said weighted center of said ion cloud to be positioned at the approximate center of said first distance.

34. The apparatus of claim 31, wherein said reference voltage output is equal to ground, and said high voltage combining device is a summing block.

35. The apparatus of claim 31, further including another reference electrode coupled to said reference voltage output.

36. The apparatus of claim 31, wherein said first frequency is in the range of 1 kHz to 30 kHz and said second frequency is in the range of 0.1 and 500 Hz.

37. The apparatus of claim 30, wherein said multi-frequency voltage is disposed to create a polarizing field that causes a portion of said positive ions to disperse closer to the first position.

38. The apparatus of claim 30, wherein said multi-frequency voltage is disposed to create a polarizing field that causes a portion of said negative ions to disperse closer to the first position.

39. The apparatus of claim 30, wherein said ionizing electrode has the shape of a filament.

* * * * *